Oct. 7, 1969  J. R. FARRON ET AL  3,471,205
SQUEEZE FILM BEARINGS
Filed July 5, 1966

INVENTOR
BERNARD R. TEITELBAUM
JOHN R. FARRON

BY *James L. O'Brien*

ATTORNEY

3,471,205
SQUEEZE FILM BEARINGS

John R. Farron and Bernard R. Teitelbaum, Birmingham, Mich., assignors to The Bendix Corporation, a corporation of Delaware Filed July 5, 1966, Ser. No. 562,770
Int. Cl. F16c *35/00, 32/00*

U.S. Cl. 308—9                       6 Claims

This invention relates generally to squeeze film bearings and more particularly to an improved squeeze film bearing assembly which provides thrust bearing capability as well as journal bearing capability.

The invention described herein was made in the performance of work under a NASA contract and is subject to the provisions of section 305 of the National Aeronautics and Space Act of 1958, Public Law 85–568 (72 Stat. 435; 42 U.S.C. 2457).

The so-called squeeze film effect is obtained in a bearing by providing for vibration of at least one of two adjacent relatively movable surfaces at a high frequency and low amplitude so that the gap between the two surfaces changes dynamically. This produces a compressed gas (which may be air) layer between the two surfaces so that they can move relative to each other with a minimum of frictional forces therebetween. One of the principal problems involved in the manufacture of bearings utilizing this desirable squeeze film effect is the problem of mounting the vibrating or strain producing member so that its vibration will not be restricted but so that it will provide effective support for the part of the bearing moving relative to it. An essential part of such a bearing is the structure for mounting the strain producing member on the base, namely, the fixed part of the bearing. If the strain producing member is rigidly clamped to the base, it will have little freedom to oscillate and the symmetry and uniformity of the vibration will therefore be poor, resulting in impaired bearing effectiveness. On the other hand, if the strain producing member is very loosely mounted on the base, the stiffness of the bearing will be impaired, and thus its ability to withstand small changes in the load force without large deflections will be impaired. In such a bearing assembly, it is also desirable to provide both journal and thrust support for the rotating part of the bearing, minimize the number of bearing parts required and simplify the bearing structure. Accordingly, it is an object of this invention to provide an improved bearing assembly in which a single strain producing member is utilized to provide thrust bearing capability as well as journal bearing capability.

These and other desirable objectives are achieved in the bearing assembly of this invention by the relative arrangement of the three principal components of the bearing assembly, namely, the rotatable member or "float," the strain producing member, and the base. The float is constructed so that it is provided with a cylindrical outer surface and thrust surfaces which extend radially outwardly from opposite ends of the cylindrical surface. The base is arranged so that it is spaced radially outwardly from the cylindrical float surface so as to provide a space between the base and the cylindrical surface, and the base is also provided with a pair of thrust surfaces which extend radially inwardly and are spaced apart. A strain producing member, preferably formed in the shape of a tube, is positioned within the above described space, so that the inner surface of the tube is adjacent the cylindrical float surface and so that the outer surface of the tube is adjacent the base. The end faces of the tube are disposed closely adjacent but spaced from the thrust surfaces on the float and the base. The strain producing member which is in the shape of a tube can be a material having piezoelectric or magnetostrictive properties. In the following discussion only the piezoelectric case, in which the strain producing member is of well known piezoceramic material, is described since the end results are similar for both cases. When the piezoceramic tube, which is conventionally provided on its inner and outer surfaces with electrode coatings, is connected to a suitable electrical drive circuit capable of creating a difference in potential across the electrode coatings, the tube is vibrated both axially and radially. Sufficient electrical power is applied to the piezoceramic tube to provide for vibration of the tube at high frequency and low amplitude so that the movement of the strain producing tube creates a pumping action on the gas surrounding it to create compressed layers of gas located at both the inner and outer surfaces of the strain producing member and at the end faces. As a result, the rotatable member is journaled on a layer of compressed gas located on the inner surface of the strain producing member so that the rotatable member can rotate practically friction free. Furthermore, the strain producing member itself is supported on a uniform film of compressed gas located on its radially outer surface so that it can vibrate practically without restriction but is still provided with a support distributed relatively uniformly and symmetrically over its outer surface. The compressed gas films at the end faces of the strain producing member provide practically friction free support for the thrust surfaces on the rotatable member, and also provide support for the strain producing member itself relative to the thrust surfaces on the base.

A further object of this invention, therefore, is to provide a bearing assembly utilizing the squeeze film effect which provides thrust bearing capability as well as journal bearing capability and has the additional advantage of mechanical simplicity adapting it for widespread utilization.

Further objects, features and advantages of this invention will become apparent from a consideration of the following description, the appended claims, and the accompanying drawing in which:

Figure 2:
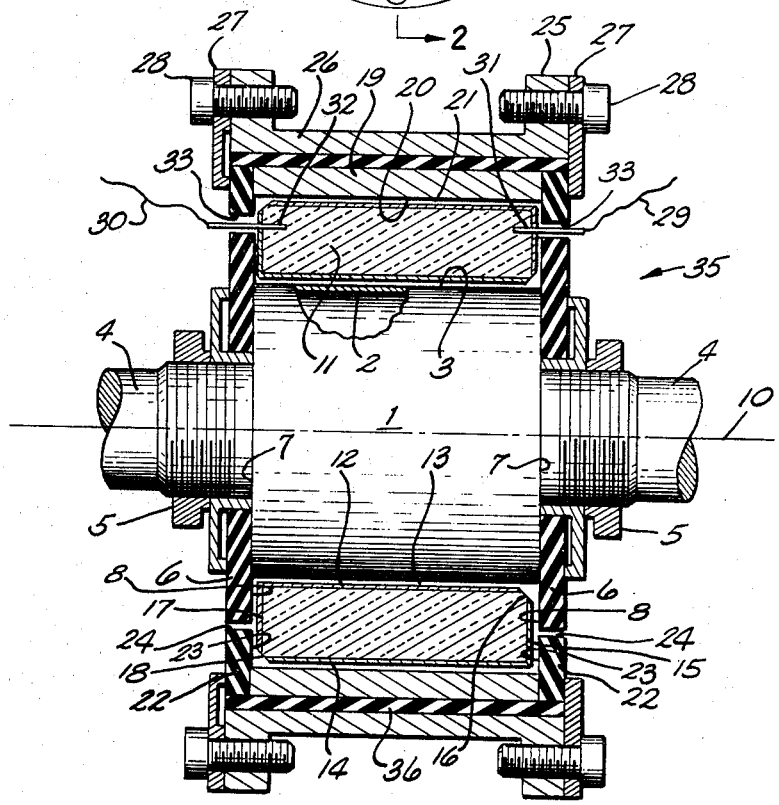
FIGURE 2 is an enlarged transverse sectional view of the bearing of this invention as seen from substantially the line 2—2 in FIG. 1.

With reference to the drawing, the bearing assembly of this invention, indicated generally at 35, is illustrated in FIG. 2 as including a rotatable member 1, which in the illustrated embodiment of the invention has a hollow center section 2 in which can be installed a gyroscope rotor or other means which enable the complete bearing to function as a useful instrument. The hollow center section 2 is provided with a cylindrical outer surface 3 and is secured to end shafts 4. The shafts 4 are threaded for supporting nuts 5 which hold thrust plates 6, made of electrically insulating material, in fixed positions on the shafts 4 in which they are urged against shoulders 7. The thrust plates 6 have thrust surfaces 8 which extend radially outwardly beyond the cylindrical surface 3 and are spaced apart in a direction parallel to the axis 10 about which the member 1 is rotated.

The bearing structure 35 also includes a strain producing member 11 which, in the illustrated embodiment of the invention, is of tubular shape and is preferably formed of a piezoceramic material although it is to be understood it can also be formed of a magnetostrictive material. The tube 11 has an electrode coating 12 on its inner surface which is disposed in a closely spaced relation with the cylindrical surface 3 and is spaced therefrom by a gap 13. The tube 11 also has a second electrode coating 14 on its outer surface, and the coating 14 extends onto the end face 15 of the tube 11. The coating 14 is separated from the coating 12 at the inner edge corner 16 of the tube 11 which is beveled as shown in FIG. 2. The coating 12 extends onto the opposite end face 17 of the tube 11 and is separated from the coating 14 at the outer edge corner 18 of the tube 11 which is also beveled to remove the coating.

A tubular base member 19 is positioned in a substantially concentric relation about the strain producing tube 11 so that the inner surface 20 of the base 19 is in a closely spaced relation with the outer electrode coating 14 on the tube 11 and is spaced therefrom by a gap 21. Annular end plates 22 are clamped to opposite ends of the base member 19 so that they extend radially inwardly with their inner sides 23 in a spaced relation with the ends of the strain producing tube 11 and with their inner edges 24 in a spaced relation with the radially outer edges of the thrust plates 6.

The base member 19 is mounted in a fixed position on a housing 25 which includes a tubular section 26. Rings 27, secured to opposite ends of the housing 25 by bolts 28 engage the end plates 22, which are made of electrically insulating material, so as to hold the plates 22 against the ends of the tube 19. The tube 19 is insulated from the base 25 by an insulating layer 36.

In order to vibrate or oscillate the piezoceramic tube 11, it is only necessary to create an electrical potential across the electrode coatings 12 and 14. This is accomplished in the present invention by suitable alternating current signal generation means, not shown, and electrical connection means including a pair of electrical conductors, namely, a hot lead 29 and a ground lead 30. The hot lead 29 is connected to a rod probe 31 extended into the end face 15 of the tube 11 so as to be in electrical contact with the electrode coating 14. A similar rod probe 32 extends into the end face 17 of the tube 11 in electrical contact with the electrode coating 12. Probes 31 and 32 are extended through grooves 33 (FIG. 1) formed in the inner edges 24 of the base end plates 22 so as not to interfere with operation of the bearing assembly 35.

In the operation of the bearing assembly 35, assume that through the conductor 29 an alternating polarity voltage has been applied to electrode coating 14, the conductor 30 and electrode coating 12 being grounded externally. The applied voltage results in high frequency low amplitude vibration of the strain producing tube 11 in directions both parallel and perpendicular to the axis of rotation 10 of the rotating member 1. This vibratory movement of the strain producing tube 11 creates a compressed gas film in the gap 13 on which the cylindrical outer surface 3 of the rotating member can rotate practically friction free. In addition, this movement of the strain producing tube 11 creates a second gas film in the gap 21 on which the strain producing tube 11 is itself supported. This gas film will not restrict vibratory movement of the strain producing tube 11 and also provides a uniform and symmetrical support for the tube 11. Additionally, the vibratory movement of the strain producing member 11 in a direction parallel to the axis 10 creates compressed gas films at the opposite ends 15 and 17 of the tube 11. These latter gas films provide thrust support for the thrust plates 6 thereby providing the bearing assembly 35 with thrust load resisting capability as well as journal bearing capability. The gas films at the ends 15 and 17 of the tube 11 also provide support in the axial direction for the tube 11 with respect to the base end plates 22. The gap between the outer edges of the thrust plates 6 and the inner edges 24 of the base end plates 22 is of sufficient size to provide for the necessary movement of the thrust plates 6 when the rotatable member 1 is loaded, but are sufficiently small to enable the creation of the desired gas films on the inner surfaces 8 and 23 of the thrust plates 6 and 22, respectively.

Figure 3:
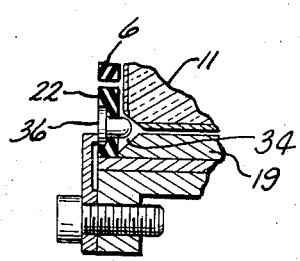
FIGURE 3 is a fragmentary sectional view of a portion of the bearing assembly of this invention, and illustrates an alternate method of preventing gross rotation of the strain producing member.

To prevent the strain producing tube 11 from being continuously rotated by the viscous drag exerted thereon by the gas film in the gap 13 during rotation of the rotatable member 1, a pin 36 (FIG. 3) can be mounted on one of the base end plates 22 and is projected through the base end plate 22 into a cavity 34 formed locally at the juncture of the outer edge of the tube 11 and the adjacent edge of the base 19, there being clearance between the pin 36 and the cavity 34. The pin 36 thus limits the angle through which the tube 11 can rotate to a small value.

Figure 1:
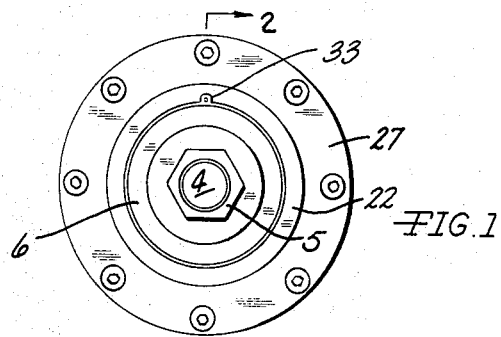
FIGURE 1 is a plan view of the bearing assembly of this invention.

It is to be understood that the structure shown in FIGS. 1 and 2 also prevents the strain producing tube 11 from being rotatably dragged because one or both rod probes 31 and 32 project outward from the surfaces 15 and 17, respectively, through slots 33 in the base end plates 22 with suitable clearance. A torque on the tube 11 will cause one or both of the rod probes 31 and 32 to contact the sides of the slots 33 and stop the rotation of tube 11.

From the above description it is seen that this invention provides an improved bearing assembly 35 having both thrust bearing capability and journal bearing capability by virtue of the construction and arrangement of the principal components, namely, the strain producing tube 11, the rotatable member 1, and the base 19. This also enables the bearing assembly 35 to be manufactured from a relatively small number of parts.

It will be understood that the journal and thrust bearing assembly utilizing squeeze films which is herein disclosed and described is presented for purposes of explanation and illustration and is not intended to indicate limits of the invention, the scope of which is defined by the following claims.

We claim:

1. In a bearing assembly, a rotatable member adapted to be rotated about an axis and having a cylindrical surface substantially concentric with said axis and axially spaced thrust surfaces which are substantially perpendicular to said axis and extend radially outwardly from said cylindrical surface, a tubular strain producing member having inner and outer surfaces and end faces, said strain producing member being positioned about said cylindrical surface in a substantially concentric relation therewith so that said inner surface and said cylindrical surface are in a closely spaced relation and so that each of said end faces of said strain producing member is in a closely spaced relation with one of said thrust surfaces, a base member having a surface disposed in a closely spaced relation with the outer surface of said strain producing member, and means operatively associated with said strain producing member for causing said strain producing member to vibrate at a high frequency and low amplitude in directions both axially and radially with respect to said axis of said rotatable member to thereby create a first compressed gas film between said strain producing member inner surface and said cylindrical surface, a second compressed gas film between said strain producing member outer surface and said base surface, and additional compressed gas films between said end faces and said thrust surfaces.

2. In a bearing assembly having the structure set forth in claim 1 wherein said base member has axially spaced thrust faces which are substantially perpendicular to said base member surface and extend radially inwardly therefrom toward said axis so that said thrust faces are in a closely spaced relation with said end faces on said strain producing member and are separated therefrom by said additional compressed gas films.

3. In a bearing assembly having the structure set forth in claim 1 wherein said strain producing member is a piezoceramic material having a first electrode coating on said inner surface thereof and one end face and a second electrode coating electrically spaced from said first electrode coating and disposed on said outer surface thereof and the other end face, said structure further including electrical conductor means connected to said coatings for creating an electrical potential therebetween.

4. In a bearing assembly having the structure set forth in claim 3 wherein said conductor means consists of a pair of probes extended into said strain producing member through said end faces so as to be in electrical contact with said electrode coatings.

5. In a bearing assembly having the structure set forth in claim 2 wherein said thrust faces on said base member are formed by annular end plates secured to said base member, each of said end plates being formed at its radially inner edge with a groove extending substantially parallel to said axis, and probes positioned in said grooves and electrically connected to said electrode coatings.

6. In a bearing assembly having the structure set forth in claim 2 wherein said thrust faces on said base member are formed by annular end plates secured to said base member, and means carried by one of said end plates and extending toward said strain producing member for engagement therewith to restrain rotation thereof.

References Cited
UNITED STATES PATENTS 3,304,132   2/1967   Broeze et al. _____ 308—1

MARTIN P. SCHWADRON, Primary Examiner

F. SUSKO, Assistant Examiner